United States Patent [19]

Hartshorn et al.

[11] 4,392,983

[45] Jul. 12, 1983

[54] TRANSITION METAL COMPOSITION, PRODUCTION AND USE

[75] Inventors: Angus J. Hartshorn, Runcorn; Eric Jones, Tarporley, both of England

[73] Assignee: Imperial Chemical Industries PLC, London, England

[21] Appl. No.: 285,526

[22] Filed: Jul. 21, 1981

[30] Foreign Application Priority Data

Jul. 21, 1980 [GB] United Kingdom ............... 8023814
May 6, 1981 [GB] United Kingdom ............... 8113834

[51] Int. Cl.$^3$ .......................... C08F 4/02; C08F 4/44; C08F 4/70
[52] U.S. Cl. ......................... 252/429 B; 252/429 C; 526/125
[58] Field of Search ............... 526/125; 252/429 C, 252/429 B

[56] References Cited

U.S. PATENT DOCUMENTS

| | | | |
|---|---|---|---|
| 3,849,334 | 11/1974 | Frielingsdorf | 252/429 B |
| 3,989,881 | 11/1976 | Yamaguchi et al. | 252/429 B |
| 4,220,554 | 9/1980 | Scata et al. | 252/429 B |
| 4,293,673 | 10/1981 | Hamer et al. | 252/429 B |

FOREIGN PATENT DOCUMENTS

| | | |
|---|---|---|
| 4647 | 10/1979 | European Pat. Off. . |
| 20818 | 7/1981 | European Pat. Off. . |
| 1472824 | 6/1974 | United Kingdom . |
| 1502567 | 3/1975 | United Kingdom . |
| 1434543 | 5/1976 | United Kingdom . |
| 1536171 | 12/1978 | United Kingdom . |
| 2029840 | 3/1980 | United Kingdom . |
| 1565572 | 4/1980 | United Kingdom . |

*Primary Examiner*—Arthur P. Demers
*Attorney, Agent, or Firm*—Cushman, Darby & Cushman

[57] ABSTRACT

A transition metal composition has the composition $M_{m'}X_{p'}TY_{n'}Z$ where M is a metal of Groups Ib, IIa, IIIb, VIIa or VIII of the Periodic Table, X is an anion, T is a transition metal of Groups IVA—VIA of the Periodic Table, Y is an anion, Z is a melt-producing compound, m' is greater than zero and less than 100, n' is greater than zero and less than 8 (m'+1), and p' is m' x(valency of M)/(valency of X). The compositions of this type may be transformed into a liquid by heating and the hot liquid sprayed and the spray cooled. The sprayed material has a useful particle form and may be used as a component of a polymerization catalyst to polymerize an unsaturated monomer such as ethylene.

12 Claims, No Drawings

TRANSITION METAL COMPOSITION, PRODUCTION AND USE

The present invention relates to transition metal compositions, a process of treating such compositions and the use of such compositions as a component of a polymerisation catalyst to polymerise unsaturated monomers such as ethylene.

The desirability of obtaining transition metal compositions in the form of spheroidal particles which can be used in a catalyst system to effect the polymerisation, particularly in the gas phase, of unsaturated monomers such as the olefin monomers, to produce spheroidal polymer particles, is well recognised. British Patent Specification No. 1 434 543 describes the preparation of a catalyst component, in which preparation molten hydrated magnesium chloride is sprayed to form spheroidal particles, which are then partially dehydrated and reacted with a halogen-containing titanium component to form the catalyst component.

We have now found that certain liquid compositions which comprise a transition metal compound and optionally a compound which on heating with the transition metal compound forms a single phase liquid (hereinafter referred to for convenience as "melt producing compound") can be sprayed to form catalyst components in the shape of essentially spheroidal particles, having a diameter which is typically between 1 and 5000 micron. Where it is desired to obtain a catalyst component in the form of essentially spheroidal particles which comprises a transition metal compound and a non-transition metal compound, the process of the present invention affords greater control of the ratio of transition metal to non-transition metal than the melt process used hitherto and avoids the difficulties associated with the reacting of particles with a transition metal compound, such as titanium tetrachloride. The essentially spheroidal particles prepared by the process of the present invention when they have certain compositions, e.g., they contain magnesium, can be converted, by treatment with a suitable Ziegler activator, into olefin polymerisation catalysts having useful characteristics.

Accordingly, one aspect of the present invention provides a process for the production of a transition metal composition which process comprises spraying a material which comprises a hot single phase liquid and cooling the spray so formed so as to obtain essentially spheroidal particles characterised in that the said single phase liquid has a composition represented by the general formula:

$$M_m X_p TY.nZ \qquad (I)$$

where
M, where present, represents at least one metal of Groups Ib, IIa, IIIb, VIIa, VIII or the lanthanide series of the Periodic Table,
X, where present, represents at least one anion,
T represents at least one transition metal of Groups IVA, Va or VIA of the Periodic Table,
Y represents at least one of the following atoms or groups: halide, oxyhalide, amino, alkoxide, thioalkoxide, carboxylate or sulphonate in an amount to satisfy the valency which T has in the composition.,
Z, where present, represents at least one melt-producing compound which, on heating with the transition metal compound TY, forms a single phase liquid,
m is 0 or a number less than 100,
n is 0 or a number less than 8 (m+one), and

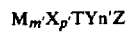

$$p \text{ is } \frac{m \times (\text{valency of } M)}{(\text{valency of } X)}$$

A second aspect of the present invention provides a solid product in the form of essentially spheroidal particles, which solid product comprises a complex of general formula (II)

$$M_{m'} X_{p'} TYn'Z$$

where
M, X, T, Y and Z are as hereinbefore defined,
m' is a number which is greater than zero and less than 100;
n' is a number which is greater than zero and less than 8(m'+one); and

$$p' \text{ is } \frac{m \times (\text{valency of } M)}{(\text{valency of } X)}$$

with the provisos
(a) where Z is an alkyl ester of an aromatic acid, m' is more than 5 and n' is more than 0.8(m'+one); or
(b) where an inert particulate support material is present and Z is an alcohol, m' is more than 6.

The essentially spheroidal particles obtained by the process of the first aspect of the present invention, or which form the solid product of the second aspect of the present invention, typically have an average particle size between 1 and 5000, preferably between 10 and 100, microns.

Whilst the hot single phase liquid which is used in the process of the present invention may be formed, for example, either by heating a pre-formed adduct of the at least one transition metal compound and the at least one melt-producing compound or by dissolving the at least one transition metal compound and the at least one metal M compound in the at least one melt-producing compound, where a metal M compound is used and the melt-producing compound is a liquid, and removing excess melt-producing compound, preferably, however, the hot liquid is formed by heating a mixture of the at least one transition metal compound, the at least one metal M compound (where it is used) and the at least one melt-producing compound (where it is used) in the ratio to give a desired composition of general formula I. It will be appreciated that in at least many cases the hot liquid can be regarded as being a melt of the at least one transition metal compound, the optional at least one metal M compound and the optional at least one melt-producing compound.

The temperature of the hot single phase liquid which is used in the process of the present invention is in the range 30° C. to 400° C. and preferably in the range of 80° C. to 180° C. Where the hot liquid is a melt it can be at a temperature in the range from the melting point of the melt to the decomposition temperature of the melt, however, typically, it is at a temperature in the range from the said melting point at 100° C. above the said melting point and preferably in the range from the said melting point to 20° above the said melting point.

The hot single phase liquid which is used in the process of the present invention is conveniently formed in an autoclave.

The material which is used in the process of the present invention, may, if desired, comprise the hot single phase liquid together with, for example mixed with, an inert diluent which is a liquid, a meltable solid or a solid which is not meltable, such as an aliphatic, aromatic or cycloparaffin hydrocarbon, atactic polypropylene, polyethylene or an inorganic oxide. However, whilst the presence of a liquid or meltable diluent is not preferred, the presence of a solid diluent is often preferred. By solid diluent we mean a compound, or mixture of compounds, which does not melt or dissolve in the hot single phase liquid used in the process of the present invention and which has an average particle size of less than 1 micron and preferably less than 0.1 microns. Examples of suitable solid diluents include oxides, such as silica, alumina and magnesia. Where a solid diluent is used in the process of the present invention the ratio by weight of the solid diluent to the hot single phase liquid is typically in the range 2:1 to 1:100 and preferably in the range 1:1 to 1:4.

The hot single phase liquid which is used in the process of the present invention may, if desired, be in contact with, e.g. mixed with, an inert particulate support material the particles of which typically have diameters of many tens of microns, for example from 5 up to 100 microns. Suitable inert particulate support materials, which may be organic or inorganic, include inter alia silica, alumina, thoria, zirconia and mixtures thereof. However, the presence of an inert particulate support material is not preferred.

The spray which is generated in the process of the present invention may be generated by passing the material which comprises hot single phase liquid through any device which is suitable for producing a spray, for example, a nozzle, to form a spray of liquid particles. The spray is typically generated as a cone spray, which may be hollow or solid, or a fan spray or by pneumatic atomisation or by other mechanisms such as centrifugal force in spinning discs.

The size of the liquid particles in the spray, and hence of the solidified particles, depends inter alia on the viscosity and surface tension of the material which comprises the hot single phase liquid, the pressure which is used to generate the spray, the nozzle diameter and the angle of the spray. For any particular composition simple experiment will readily reveal suitable pressure-nozzle diameter combinations to provide a desired size of particles. In general, the pressure used to generate the spray is from 5 to 100 kg/cm$^2$, the actual pressure used being dependent on, inter alia, the viscosity of the not liquid, the nozzle diameter and the spray angle. Thus, where the material is a hot liquid which comprises magnesium chloride, titanium trichloride and methanol and it is desired to form particles of mean diameter about 80 microns we have found that a pressure of about 30 kg/cm$^2$ gauge and a nozzle diameter of about 0.5 millimeters are suitable.

The liquid particles in the spray are solidified in an inert gaseous atmosphere, for example nitrogen, or in a cold inert liquid, for example, a hydrocarbon. Preferably the particles are solidified in a gaseous atmosphere, since this increases their sphericity. Where the gaseous atmosphere is above an inert liquid in which the solid essentially spheroidal particles are cooled further, the solid essentially spheroidal particles can be recovered therefrom, for example, by filtration.

In general formula (I), preferably m is in the range 5 to 50. Transition metal compositions of the present invention in which m is less than 5 and in which no solid diluent is present tend, when used as a catalyst component in the gas phase fluidised bed polymerisation of ethylene, to cause control problems associated with localised overheating. Transition metal compositions of the present invention in which m is more than 50 tend not to have adequate activity when used as a catalyst component in the polymerisation of olefin monomers such as ethylene.

The at least one metal M, where present, in general formula (I) is preferably copper, magnesium, calcium, aluminium, iron, cobalt, nickel or manganese, more preferably magnesium or a mixture of magnesium either with (a) a Group VII metal, preferably manganese, (b) a Group VIII metal, preferably nickel or iron or (c) a Group Ib metal, preferably copper. Where it is desired to use the transition metal composition in a catalyst system to obtain polyolefins which have a broad molecular weight distribution, the aforesaid mixtures may usefully be used in the production thereof.

The at least one transition metal in general formula (I) is preferably titanium, zirconium, vanadium, molybdenum, or chromium, more preferably titanium.

It is often preferred that the at least one transition metal used in the process of the present invention is in less than its maximum valency state since we have found that where the at least one transition metal is in its maximum valency state, and where the at least one melt-producing compound is an alcohol, there is a tendency for chemical reaction of the alcohol with the at least one transition metal compound to occur in the hot liquid to rupture T-Y bonds. Where such reaction occurs, it may be necessary to treat the particles with a suitable halogen containing compound to form a product which can be used as a catalyst component and it is preferred to heat the particles to remove at least partially the alcohol prior to treatment with the halogen-containing compound. For example, we have found that essentially spheroidal particles prepared by the process of the present invention from a composition which comprises magnesium chloride, titanium tetrachloride and methanol may be heated at 90° C., partially to remove methanol, and the resulting particles are treated with a suitable halogen-containing compound, e.g. AlEt$_{1.5}$Cl$_{1.5}$, and then activated with an activator for a Ziegler-catalyst system to form a catalyst system having useful properties.

The at least one anion X, where present, in general formula (I) is typically a halide, sulphate, phosphate, alkoxide, or carboxylate, e.g. an acetate, and is preferably a halide, more preferably a chloride.

The at least one transition metal compound which may be used in the process of the present invention includes halides, halo-oxides, alkoxides, haloalkoxides, acetyl acetonates, long chain carboxylates, e.g. stearates, and polytitanates having the general formula

where R is a hydrocarbyl group, e.g. alkyl, aryl, aralkyl or alkaryl and x is greater than or equal to 2, especially 2 to 10. Preferably the at least one transition metal compound is a halide, more preferably a chloride.

Suitable melt-producing compounds which may be used in the process of the present invention include organic compounds and inorganic compounds. Organic compounds are preferred, for example aliphatic alcohols having, for example, 1 to 12 carbon atoms, such as methanol, ethanol, isopropanol, octanol, 2-butanol and ethylene glycol; aromatic alcohols, preferably having 7 to 15 carbon atoms such as benzyl alcohol; phenols, preferably having 6 to 18 carbon atoms such as phenol, cresol and chlorophenol; aliphatic carboxylic acid esters, preferably having 2 to 30 carbon atoms such as methyl formate, ethyl acetate, butyl acetate, vinyl acetate, methyl acrylate and ethyl laurate; aromatic carboxylic acid esters, preferably having 8 to 30 carbon atoms such as methyl benzoate, ethyl benzoate, ethyl p-methylbenzoate and propyl p-hydroxybenzoate; aliphatic ethers, preferably having 2 to 20 carbon atoms such as ethyl ether, butyl ether, allyl butyl ether, methyl undecyl ether and amyl ether; polyethers; cyclic ethers, preferably having 2 to 20 carbon atoms such as tetrahydrofuran and dioxane; aliphatic amines, preferably having 1 to 18 carbon atoms such as methylamine, diethylamine, tributylamine and octylamine; aromatic amines, preferably having 6 to 18 carbon atoms such as aniline and naphthylamine; aliphatic ketones having 3 to 15 carbon atoms such as acetone, methylisobutyl ketone, ethyl butyl ketone and dihexyl ketone; aliphatic aldehydes containing 2 to 12 carbon atoms such as acetaldehyde and propionaldehyde; aliphatic carboxylic acids having 2 to 18 carbon atoms such as acetic acid, propionic acid, valeric acid and acrylic acid; aliphatic nitriles having 2 to 18 carbon atoms such as acetonitrile and acrylonitrile; aromatic nitriles having 7 to 20 carbon atoms such as benzonitrile and phthalonitrile; amides having 2 to 18 carbon atoms such as acetamide; phosphines such as triethyl phosphine and triphenyl phosphine; phosphoramides such as hexamethyl phosphoramide; esters of phosphoric acid or phosphorous acid, e.g. triphenyl phosphate; esters of carbonic acid, e.g. ethylene carbonate; heterocyclic compounds, e.g. pyridine; and urea. Preferably the organic compound is an electron donor compound, particularly preferably an aliphatic alcohol having 1 to 6 carbon atoms and more particularly preferably methanol.

Suitable inorganic melt-producing compounds include for example, phosphorus oxyhalides such as phosphorus oxychloride; and sulphur halides and oxyhalides such as sulphur dichloride, sulphuryl chloride and thionyl chloride.

Preferred metal M compound/melt-producing compound adducts which may be used in the process of the present invention include magnesium halide/alkanol adducts, for example, magnesium chloride/methanol, magnesium chloride/ethanol and magnesium chloride/2-butanol adducts.

Preferred transition metal compound/melt-producing compound adducts which may be used in the process of the present invention include titanium halide/alkanol adducts, for example, titanium trichloride/methanol, titanium trichloride/ethanol, and titanium trichloride/2-butanol adducts.

The solid, essentially spheroidal particles obtained by the process of the present invention may be used as such as a component of a polymerisation catalyst. However, it is often preferred to subject the particles to further treatment to effect at least partial removal of the at least one melt-producing compound since such a treatment often increases the voidage of such particles and hence the catalytic activity thereof. Furthermore, we have found that to obtain polymers which have narrow molecular weight distribution it is preferred that in catalyst components of general formula (I) n lies in the range 1.0 (m+1) to 1.8 (m+1) and more preferably is about 1.4 (m+1), where m has the value hereinbefore ascribed to it.

Where at least partial removal of the at least one melt-producing compound is desired it may be effected, for example, by heating, under vacuum if necessary, or by treating with a suitable compound which will remove either physically or by chemical interaction, all or part of the at least one melt-producing compound without adversely affecting the polymerisation activity of catalysts prepared therefrom, for example, by deactivation or over-reduction of the at least one transition metal compound.

The at least partial removal of the at least one melt-producing compound, especially when the at least one melt-producing compound is an alcohol, is preferably carried out by heating, more preferably by heating in a fluidised bed. Where the at least one melt-producing compound is an alcohol we have found that it is often not possible by heating the essentially spheroidal particles in an inert atmosphere to reduce the concentration of melt-producing compound in the essentially spheroidal particles to below about 0.8 moles per mole of total metal compound (i.e. transition metal compound plus metal M compound) without at least impairing their capacity to generate active olefin polymerisation catalysts. However, by heating the essentially spheroidal particles in an atmosphere which contains the anion which is present in the transition metal compound and, where it is present, in the metal M compound, substantially all the melt-producing compound can be removed to leave essentially spheroidal particles which are capable of generating active polymerisation catalysts. For example, where the essentially spheroidal particles consist of a magnesium chloride/titanium trichloride/methanol adduct, substantially all the methanol can be removed therefrom by heating them in an atmosphere which contains anhydrous hydrogen chloride.

Where the at least one melt-producing compound is an alcohol, there is an upper limit to the temperature at which the alcohol can be removed from the spheroidal particles, which limit is dependent on the composition of the spheroidal particles. At temperatures above this limit at least partial chemical reaction of the alcohol with the at least one transition metal compound and/or the at least one metal M compound, where it is present, occurs with rupture of M—X and/or T—Y bonds. Typically, this temperature limit lies in the range 100° C. to 180° C. and is often above 150° C.

Where the at least one melt-producing compound is an alcohol, suitable compounds which are capable of removing all or part of the at least one melt-producing compound from the essentially spheroidal particles prepared by the process of the present invention include inter alia metal hydrocarbyl compounds and reactive halogen-containing compounds. Examples of suitable metal hydrocarbyl compounds, which are used in amounts which are approximately stoichiometric with respect to the amount of melt-producing compound present in the essentially spheroidal particles, include dialkyl magnesiums; alkyl aluminium halides, e.g. ethyl aluminium sesqui-chloride and diethyl aluminium chloride; alkoxy aluminium alkyls, for example, having the general formula $R^1AlOR^2$ where $R^1$ and $R^2$ are alkyl groups; and alkyl and alkoxysilanes, for example those having the general formula $R_y{}^3SiH_{4-y}$ and $(R^3O)_y\text{-}SiH_{4-y}$ where $R^3$ is alkyl and y is an integer from 1 to 4. Examples of suitable reactive halogen-containing compounds, which are preferably reactive chlorine-containing compounds, include inter alia, hydrogen halides, e.g. hydrogen chloride; silicon halides, e.g. silicon tetrachloride, trimethyl silicon monochloride, diethyl silicon dichloride and monobutyl silicon trichloride; carboxylic acid halides, e.g. acetyl chloride, benzoyl chloride, p-methoxybenzoyl chloride and p-fluorobenzoylchloride; phosphorus halides, e.g. phosphorusoxytrichloride and phosphorus pentachloride; phosgene; sulphur halides, e.g. sulphuryl chloride and thionyl chloride; halides of mineral acids, e.g. boron trichloride; chlorinated polysiloxanes; ammonium hexafluorosilicate; and antimony pentachloride.

The ratio of the at least one transition metal of Groups IVA, VA or VIA to the at least one metal M in the essentially spheroidal particles prepared by the process of the present invention may be varied. For example, where the at least one transition metal of Groups IVA, VA or VIA comprises titanium which is present as titanium tetrachloride a proportion of the titanium tetrachloride may be removed from the essentially spheroidal particles by sublimation, or by dissolution in a suitable solvent, for example, where the essentially spheroidal particles comprise a magnesium chloride/titanium tetrachloride/ethyl acetate adduct a titanium tetrachloride/ethyl acetate adduct may be removed by dissolution in toluene or titanium tetrachloride may be removed by dissolution in hot ethyl acetate. However, these variations are not preferred.

Preferred solid products in accordance with the second aspect of the present invention are magnesium chloride/titanium chloride/methanol adducts. It is particularly preferred that the solid product is a complex of general formula:

$$m^2MgCl_2.TiCl_x.n^2CH_3OH$$

wherein
 $m^2$ is a number which is in the range from 5 up to 50;
 $n^2$ is a number which is greater than zero and less than 8 $(m^2+\text{one})$; and
 x is 3 or 4.

The magnesium chloride/titanium chloride/methanol adduct may also incorporate at least one further metal halide selected from zirconium chloride, vanadium chloride, manganous chloride, a chloride of iron, nickel chloride and copper chloride. Preferred materials of this type are those represented by the general formula:

$$m^2MgCl_2.aM^1Cl_y.cTiCl_x.bT^1Cl_z.n^3CH_3OH$$

where
 $m^2$ and x are as hereinbefore defined,
 $M^1$ is at least one metal selected from manganese, iron, nickel and copper;
 $T^1$ is at last one metal selected from vanadium and zirconium;
 a is zero or a number having a value less than the value of $m^2$;
 $(m^2+a)$ has a value of from 5 up to 50;
 b is zero or a number having a value of less than 5c;
 c is a number which is greater than zero and does not exceed one;
 $(b+c)$ has a value of one;
 $n^3$ is a number which is greater than zero and less than 8 $(m^2+a+\text{one})$;
 y is equal to the valency of $M^1$; and
 z is 3 or 4; with the proviso that at least one of a and b has a value greater than zero.

It is particularly preferred that $n^2$ has a value in the range 1.0 $(m^2+\text{one})$ up to 1.8 $(m^2+\text{one})$ and $n^3$ has a value in the range 1.0 $(m^2+a+\text{one})$ up to 1.8 $(m^2+a+\text{one})$.

A third aspect of the present invention provides a polymerisation catalyst in the form of essentially spheroidal particles of a transition metal composition and a suitable Ziegler activator. Preferably the essentially spheroidal particles are prepared by the process of the first aspect of the present invention or are formed of the solid product which is the second aspect of the present invention. The suitable activator is an organometallic compound of Groups I-IV of the Periodic Table and preferably is an organometallic derivative of a metal of Groups IA, IIA, IIB, IIIB or IVB of the Periodic Table, particularly preferably the metal is aluminium and more particularly preferably the activator is a trialkyl aluminium. It will be appreciated that sufficient of the said activator is employed to transform the metal atoms of the transition metal compound known to be useful in forming Ziegler-Natta catalysts to an active state.

The essentially spheroidal particles of a transition metal composition may be treated with the aforesaid activator by methods known in the art, for example, they may be reacted totally outside or inside the polymerisation vessel in which the catalyst is to be used or activation may be effected partially outside the polymerisation vessel and completed inside the said polymerisation vessel.

A fourth aspect of the present invention provides a process for the polymerisation or copolymerisation of an olefinically unsaturated monomer which process comprises contacting, under polymerisation conditions, at least one olefin monomer with a catalyst in accordance with the present invention.

The term "olefinically unsaturated monomer" is intended to include mono-olefins such as ethylene, propylene and 4-methylpentene-1.

The catalysts of the present invention may also be used to initiate the copolymerisation of two or more olefinically unsaturated monomers. For example, ethylene may be copolymerised with a small amount of propylene, butene-1, hexene-1 or decene-1, 1,3-butadiene or styrene to give polymers which typically have less than 10% w/w of the comonomer.

Polymerisation processes according to the present invention may be carried out by techniques generally used for polymerisation processes of the type using Ziegler catalysts.

The choice of conditions of pressure and temperature will vary with factors such as the nature of the monomer and catalyst and whether liquid, e.g. bulk or diluent, or gas phase polymerisation is used.

For example, when ethylene is polymerised, pressures from sub-atmospheric to several thousand atmospheres may be used. Low pressure (say from 0.1 to 30 atmospheres) and intermediate pressure (say from 30 to 300 atmospheres) polymerisation may be carried out using conventional equipment; but very high pressure polymerisation must be performed using suitable specialised reactors and pumping equipment. However, since, generally speaking, the higher the pressure the higher the activity, the use of such techniques may be justified. If very high pressures are used, it is preferred that conditions are such that the ethylene feed and polyethylene produced are maintained in a single fluid phase, i.e. the pressure should exceed 500 Kg/cm$^2$ preferably 1000 to 3000 Kg/cm$^2$ and the temperture should be greater than 125° C., say 140°-300° C. This type of process is usually operated in a continuous manner.

A wide range of temperatures may be used, but in general low and intermediate pressure ethylene polymerisations are carried out at temperatures in the range 50°-160° C.

When the process of the present invention is used to polymerise propylene, it is preferred to operate under conditions commonly used for the polymerisation of propylene. However, polymerisation of propylene under other conditions, e.g. high pressure, is not excluded.

It is also within the scope of our invention to use our compositions to initiate the copolymerisation of ethylene and propylene together and/or with other olefinically unsaturated monomers.

The polymerisation process of the present invention may be carried out in the liquid or gaseous phase (i.e. in the essential absence of a liquid medium) and preferably in the gaseous phase. Where polymerisation is effected in the liquid phase, and the monomer is not liquid under the polymerisation conditions, the monomer may be dissolved in a suitable solvent. Examples of suitable solvents are aliphatic or aromatic hydrocarbons; for instance, pentane, hexane, heptane, octane, decane, benzene, toluene and mixtures thereof.

Polymerisation may be effected either in a batch manner or on a continuous basis, and the transition metal composition of the present invention and the activator therefore may be introduced into the polymerisation vessel separately or the transition metal composition and activator may be mixed together before being introduced into the polymerisation reactor.

Preferably, however, the polymerisation process of the present invention is effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidised by the continuous flow of the gaseous monomer, and gaseous diluent to remove heat of polymerisation through the reaction zone. A suitable rate of gas flow may be readily determined by simple experiment. Make up of gaseous monomer to the circulating gas stream is at a rate equal to the rate at which gas and particulate polymer product is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The said gas is passed through a heat exchanger wherein it is stripped of the heat of polymerisation, compressed in a compressor and then returned to the reaction zone.

Chain transfer agents may be used in a polymerisation process according to the present invention, and when ethylene is polymerised their use is normally desirable as the polyethylene produced is of very high molecular weight. Hydrogen may be conveniently used in accordance with usual practice. However, some solvents may act as chain transfer agents.

The polymerisation process of the present invention is preferably effected under an atmosphere free of oxygen, for example under an atmosphere of an inert gas, e.g. nitrogen, or of the monomer to be polymerised. It is also preferred to effect the process using apparatus and solvents which have been carefully freed from impurities, such as oxygen, water and other substances which would otherwise react with the catalysts.

The invention is illustrated by the following Examples.

In the examples hexane and heptane were purified by passage through reduced R$_{3-11}$ copper catalyst (ex BASF Aktiengeselschaft) and 5A molecular sieve and finally by sparging with pure nitrogen immediately before use.

Ethylene and butene were purified by passage through R$_{3-11}$ copper catalyst and 5A molecular sieve. Hydrogen was purified by passing through a catalytic deoxygenation unit and 5A molecular sieve.

EXAMPLE 1

This example illustrates the preparation of a magnesium chloride/titanium trichloride/methanol adduct according to the present invention.

288 grams (1 mole) of MgCl$_2$.6CH$_3$OH (prepared by reacting 48.8 grams of magnesium turnings in 1330 mls of dried methanol, filtering the solution, passing 73 grams of dry hydrogen chloride into the filtrate, cooling the filtrate to −30° C., collecting the crystals and drying under vacuum; and shown by analysis to have the formula MgCl$_2$.6CH$_3$OH) and 16.5 grams (0.048 moles) of TiCl$_3$.6CH$_3$OH (prepared by dissolving 20 grams of titanium trichloride in 50 mls of dried methanol and evaporating to dryness; and shown by analysis to have the formula TiCl$_3$.6CH$_3$OH) were mixed and transferred under nitrogen to a one liter Inconel pressure vessel fitted with a stirrer, thermocouple and a bottom outlet and discharge valve assembly. A 0.46 mm diameter jet of the hollow cone variety having a spray cone angle of 80° was fitted under the discharge valve, the complete valve and jet assembly being heated by thermostatically controlled heating tape. The mixed methanol adducts were melted and the temperature stabilised at 140° C. The pressure was then raised to 30.6 kg/cm$^2$.g with pure nitrogen and the melt sprayed through the jet, which was at 180° C., into a nitrogen atmosphere. The product was collected in 3 liters of anhydrous heptane at −40° C. contained in a 5 liter nitrogen purged vessel.

The solid product was successively filtered from heptane, dried under vacuum at room temperature and screened to yield a fraction having a particle size distribution between 53 and 106 microns. The particles were found by analysis to have the composition:

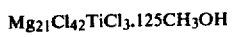

Mg$_{21}$Cl$_{42}$TiCl$_3$.125CH$_3$OH

EXAMPLE 2

This example illustrates the preparation of a magnesium chloride/titanium trichloride/methanol adduct according to the present invention.

The procedure of Example 1 was repeated except that 207 grams (1.043 moles) of MgCl$_2$.3.22CH$_3$OH (prepared by dissolving 400 grams anhydrous magnesium chloride in 3 liters of dried methanol at 60° C., filtering the solution, cooling the filtrate to −30° C., collecting the crystals, drying them under vacuum, then heating two 167.4 gram portions of the dried crystals (MgCl$_2$6CH$_3$OH) in a 62.5 mm fluid bed drier at 65° C. for 3 hours under a flow of nitrogen (4 liters per minute) and shown by analysis to have the formula MgCl$_2$.3.22CH$_3$OH) were used instead of 288 grams of MgCl$_2$.6CH$_3$OH and 26.0 grams (0.075 moles) were used instead of 14 grams of TiCl$_3$.6CH$_3$OH and the product, in the form of spheroidal particles, was screened to afford a fraction having a diameter between 45 and 125 microns and a theoretical composition (assuming no loss of methanol) Mg$_{14}$Cl$_{28}$TiCl$_3$.50.8CH$_3$OH. Analysis gave Mg$_{13.7}$Cl$_{27.4}$TiCl$_3$.52.0CH$_3$OH.

EXAMPLE 3

This example illustrates the preparation of a magnesium chloride/titanium trichloride/zirconium chloride/methanol adduct according to the present invention.

174.3 grams of MgCl$_2$.6CH$_3$OH (prepared as in Example 1), 8.3 grams of TiCl$_3$.6CH$_3$OH (prepared as in Example 1) and 19.8 grams of ZrCl$_{2.81}$(OCH$_3$)$_{1.19}$.0.85CH$_3$OH (prepared by dissolving 43.55 grams of zirconium tetrachloride in 200 mls of dried methanol, refluxing for 2 hours and evaporating to dryness to leave 47.63 grams of a solid which was shown by analysis to have the aforementioned composition) were mixed and transferred under nitrogen to the presure vessel described in Example 1. A 0.62 mm diameter jet of the hollow cone variety with a spray cone angle of 60° was fitted under the discharge valve, the complete valve and jet assembly being heated by thermostatically controlled heating tape. The mixed methanol adducts were melted and the temperture stabilized at 150° C. The pressure was then brought to 27.2 kg/cm$^2$ gauge with pure nitrogen and the melt was sprayed through the jet which had been brought to 180° C. The product was collected in 2.5 liters of anhydrous heptane at −60° C. contained in a 5 liter nitrogen purged vessel.

The solid product was successively filtered from the heptane, dried under vacuum at room temperature and screened to yield a catalyst component according to the present invention having a particle size distribution in the range 45 to 106 microns.

EXAMPLE 4

This example illustrates the preparation of a magnesium chloride/titanium trichloride/vanadium trichloride/methanol adduct according to the present invention.

222.4 grams of MgCl$_2$.6CH$_3$OH (prepared as in Example 1), 30.5 grams of VCl$_3$.5CH$_3$OH (prepared by dissolving 20.48 grams of vanadium trichloride in 100 mls of dried methanol and evaporating to dryness to leave an adduct which was shown by analysis to have the aforementioned composition) and 10.6 grams of TiCl$_3$.6CH$_3$OH (prepared as in Example 1) were mixed and melt sprayed under the conditions of Example 3.

EXAMPLE 5

This example illustrates the preparation of a magnesium chloride/titanium trichloride/manganous chloride/methanol adduct according to the present invention.

108.7 g of MgCl$_2$.6CH$_3$OH (prepared as in Example 1), 4.39 grams of TiCl$_3$.6CH$_3$OH (prepared as in Example 1) and 61.9 grams MnCl$_2$.6CH$_3$OH (prepared by dissolving 21.2 grams of manganese dichloride in 300 mls of dried methanol and evaporating to dryness to leave a residue which was shown by analysis to have the aforementioned composition) were mixed and melt sprayed using the conditions of Example 1.

EXAMPLE 6

This example illustrates the preparation of a magnesium chloride/titanium trichloride/ferric chloride/methanol adduct according to the present invention.

A mixture of 209.2 grams of MgCl$_2$.6CH$_3$OH (prepared as in Example 1), 10.1 grams of TiCl$_3$.6CH$_3$OH (prepared as in Example 1) and 44 mls of a methanol solution containing 20.6 grams of FeCl$_3$.2CH$_3$OH, was evaporated to dryness at room temperature and the residue was melt sprayed using the conditions of Example 1.

EXAMPLE 7

This example illustrates the preparation of a magnesium chloride/titanium trichloride/nickel chloride/methanol adduct according to the present invention.

A mixture of 180.2 grams of MgCl$_2$.6CH$_3$OH (prepared as in Example 1), 8.5 grams of TiCl$_3$.6CH$_3$OH (prepared as in Example 1) and a solution of 19.7 g NiCl$_2$.6CH$_3$OH in 100 ml methanol was evaporated to dryness at room temperature and the residue was melt sprayed using the conditions of Example 3.

EXAMPLE 8

This example illustrates the preparation of a magnesium chloride/titanium trichloride/cupric chloride/methanol adduct according to the present invention.

A mixture of 190.6 grams of MgCl$_2$.6CH$_3$OH (prepared as in Example 1), 9.9 grams of TiCl$_3$.6CH$_3$OH (prepared as in Example 1), and 36.3 grams of CuCl$_2$.CH$_3$OH (prepared by dissolving 43.8 grams of cupric chloride in 200 mls of dried methanol at reflux, cooling and evaporating to leave a residue which had the aforementioned composition) was melt sprayed using the conditions of Example 3.

EXAMPLES 9–16

These examples illustrate the partial removal by heating of methanol from transition metal compositions prepared by the process of the present invention.

Samples of the spheroidal particles of transition metal compositions prepared in Examples 1 to 8 were dried in a 25 mm fluid bed drier at a pre-set temperature under a flow of nitrogen (4 liters/minute). Transition metal compositions in the form of spheroidal particles were recovered and analysed. Details of the procedure and products are given in Table 1.

EXAMPLES 17–22

These examples illustrate the removal of methanol from transition metal compositions of the present invention by treatment with acetyl chloride.

GENERAL PROCEDURE

Acetyl chloride was added to a slurry of the transition metal composition in 50 mls of heptane. The mixture was stirred at 90° C. for 2 hours, cooled, filtered and washed 4 times with 20 ml portions of heptane to yield a transition metal composition which was analysed.

Details of the quantities used in the procedure and of the products are given in Table 2.

TABLE 1

| Ex. No. | Starting Material Prepared in Ex No. | Wt (gms) | Temp °C. | Time Hours | Product Weight (gms) | Composition[a] $M_m$ | X | T | Y | $nCH_3OH$ |
|---|---|---|---|---|---|---|---|---|---|---|
| 9  | 1 | 26.6 | 90  | 3 | 13.8 | $Mg_{21}$ | $Cl_{42}$ | Ti | $Cl_3$ | 39 |
| 10 | 1 | 15.9 | 130 | 3 | 6.5  | $Mg_{21.4}$ | $Cl_{42.8}$ | Ti | $Cl_3$ | 18 |
| 11 | 2 | 37.5 | 90  | 5 | 21.3 | $Mg_{13.6}$ | $Cl_{27.2}$ | Ti | $Cl_3$ | 25.8 |
| 12 | 4 | 37.7 | 90  | 3 | 17.3 | $Mg_6$ | $Cl_{12}$ | $V_{0.8}Ti_{0.2}$ | $Cl_3$ | 13.6 |
| 13 | 5 | 33.8 | 90  | 3 | 18.3 | $Mg_{27.7}Mn_{13.7}$ | $Cl_{82.8}$ | Ti | $Cl_3$ | 53.0 |
| 14 | 6 | 39.0 | 90  | 3 | 22.6 | $Mg_{16.8}Fe_{3.3}$ | $Cl_{37.2}$ | Ti | $Cl_3$ | 33.1 |
| 15 | 7 | 40.6 | 90  | 3 | 20.7 | $Mg_{22.8}Ni_2$ | $Cl_{49.6}$ | Ti | $Cl_3$ | 46.3 |
| 16 | 8 | 35.1 | 90  | 3 | 17.5 | $Mg_{22}Cu_{6.4}$ | $Cl_{56.8}$ | Ti | $Cl_3$ | 30.8 |

[a]Determined from analytical data

TABLE 2

| Example No. | Starting Material Prepared in Ex No. | Quantity (gms) | Acetyl Chloride Quantity (mls) | Product Quantity (gms) | Composition[a] M | X | T | Y | nZ |
|---|---|---|---|---|---|---|---|---|---|
| 17 | 9  | 5.3  | 20 | 5.5  | $Mg_{20.2}$ | $Cl_{40.4}$ | Ti | $Cl_3$ | 10.9 |
| 18 | 12 | 10.3 | 40 | 10.7 | $Mg_6$ | $Cl_{12}$ | $V_{0.8}Ti_{0.2}$ | $Cl_3$ | 7.4 |
| 19 | 13 | 5.5  | 20 | 5.7  | $Mg_{28}Mn_{14}$ | $Cl_{84}$ | Ti | $Cl_3$ | 53.4 |
| 20 | 14 | 9.8  | 40 | 11.8 | $Mg_{17.2}Fe_{3.4}$ | $Cl_{37.6}$ | Ti | $Cl_3$ | 30.0 |
| 21 | 15 | 6.2  | 20 | 6.4  | $Mg_{22.8}Ni_2$ | $Cl_{49.6}$ | Ti | $Cl_3$ | 29.3 |
| 22 | 16 | 5.2  | 20 | 5.9  | $Mg_{22}Cu_{6.4}$ | $Cl_{56.8}$ | Ti | $Cl_3$ | 35.8 |

[a]Determined from the analytical data on the presumption that Z is methyl acetate.

EXAMPLE 23

This example illustrates the partial removal of methanol from a magnesium chloride/titanium trichloride/methanol adduct by reaction with an aluminium compound.

80 mls of a 1 molar solution of triethyl aluminium in heptane was added to a slurry of 3.8 grams (containing 77 millimoles of methanol) of the spheroidal transition metal composition prepared in Example 1 in heptane and stirred for 1 hour. The transition metal composition was filtered off, washed twice with 20 ml portions of hexane and dried to yield spheroidal particles (1.5 grams). Analysis of the particles revealed the following concentrations: Mg 14.8%, Al 5.3%, Ti 1.62%, Cl 48% (Residue 29.48%) which concentrations approximate to the compositions:

$$Mg_{18.1}Cl_{36.2}Al_{5.8}(OCH_3)_{17.4}TiCl_3 . 9.6\ CH_3OH.$$

EXAMPLE 24

This example illustrates the partial removal of methanol by reaction with an aluminium compound from a magnesium chloride/zirconium tetrachloride/titanium trichloride/methanol adduct.

81 mls of a 0.49 molar solution of $AlEt_{1.5}Cl_{1.5}$ in heptane was added to a slurry of 7 grams of a transition metal composition prepared by heating the particles prepared in Example 3 at 130° C. for 3 hours in a fluid bed drier, in 50 mls of heptane. The mixture was heated at 80° C. for 2 hours, cooled, filtered and dried to leave 6.3 grams of a transition metal composition. Analysis of the transition metal composition revealed the following concentrations:

Mg 15.69%, Al 1.53%, Ti 1.52%, Zr 7.1%, Cl 60.9% (Residue 13.27%) which concentrations approximate to the composition $$Mg_{5.9}Cl_{11.8}Zr_{0.71}Cl_{2.0}(OCH_3)_{0.60}Ti_{0.29}$$
$$Cl_{0.87}Al_{0.51}Cl_{0.765}(OCH_3)_{0.765} . 2.4\ CH_3OH.$$

EXAMPLE 25

This example illustrates the use of a transition metal of maximum valency in the process of the present invention and the preparation of a transition metal composition therefrom.

8.79 mls (0.08 moles) of titanium tetrachloride and then 76.17 grams (0.8 moles) of anhydrous magnesium chloride were added to 600 mls of methanol and the mixture was heated to give a clear solution. The solution was evaporated to dryness to leave 248 grams of a solid residue of theoretical composition $$Mg_{10}Cl_{20}TiCl_2(OCH_3)_2 . 61\ CH_3OH.$$

The solid residue was transferred to the apparatus described in Example 1 and was melted and the temperature stabilised at 155° C. The pressure was raised to 34 kgm/cm² gauge with pure nitrogen and the melt was sprayed through the jet, which was at 175° C., into a nitrogen atmosphere. The sprayed particles were collected under anhydrous heptane (3 liters).

The particles were successively filtered from the heptane, dried under vacuum at room temperature and screened to yield a fraction having a particle size between 45 and 120 microns. The particles were found by analysis to have the composition $$Mg_{10.1}Cl_{20.1}TiCl_2(OCH_2)_2 . 60.5\ CH_3OH.$$

22 gms of the aforesaid fraction were dried in a 25 mm fluid bed drier at 90° C. for 3 hours with a 4 liter/minute flow of nitrogen.

42 mls of a 0.49 molar solution of $AlEt_{1.5}Cl_{1.5}$ were added to a slurry of 3.2 grams of the dried fraction in 100 mls of heptane and the mixture was stirred at room temperature for 30 minutes and then at 85° C. for 1 hour. The reaction mixture was filtered, washed twice with 50 mls of heptane, and dried under vacuum to yield 2.5 grams of a transition metal composition of the present invention. Analysis of the transition metal composition gave the following concentrations:

Mg, 19.85%, Al, 1.8%; Ti, 3.94%; Cl, 69.4%; residue, 5.00%. These concentrations approximate to the composition:

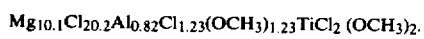

$Mg_{10.1}Cl_{20.2}Al_{0.82}Cl_{1.23}(OCH_3)_{1.23}TiCl_2(OCH_3)_2$.

EXAMPLES 26–41

These examples illustrate the use of spheroidal transition metal compositions prepared by a process of the present invention in the preparation of polyolefins.

A stainless steel pressure vessel hving a capacity of 3.8 liters was prepared by heating it to 100° C. and evacuating with an efficient vacuum pump. The vessel was cooled to 60° C. and 2 liters of purified hexane added. The vessel was then sparged at reaction pressure with about 200 liters of pure ethylene over a period of 30 minutes to remove any residual moisture and oxygen, after which it was vented, 6 ml of a molar solution of aluminium triethyl in heptane as activator and then the transition metal composition as a slurry was injected against a stream of ethylene. The vessel was then sealed and pressurised with hydrogen to 2.0 kg/cm² gauge and then to 10.2 kg/cm² gauge with ethylene. During pressurisation, 200 mls of butene-1 was added from a Klinger gauge. When full reaction pressure (10.2 kg/cm² gauge) was reached the vessel was stirred at 1000 rpm and polymerisation commenced. Reaction was allowed to continue for 2 hours at 80° C., during which time ethylene was added as required to maintain reaction pressure at 10.2 kg/cm² gauge. After 2 hours, the reactor was vented and cooled.

The copolymer slurry was removed from the autoclave and to this was added 1 liter of de-ionised water and 0.2 wt/vol % of sodium di(ethylhexyl) sulphosuccinate (Aerosol OT) calculated on polymer slurry, i.e. diluent, as a wetting agent. Steam at 100° C. was then passed into the stirred vessel at about 25 g per minute and the mixture distilled at a temperature of about 60° C., distillation being continued until no more organic material separated from the distillate. The copolymer product, which was granular in form, was then filtered from the aqueous slurry remaining in the distillation vessel, washed with water and dried under vacuum at approximately 60° C.

Details of the preparation and product are given in Table 3.

In Table 3

Fully annealed density was measured as described in ASTM 1928-70, Procedure A, using a density gradient column at 23° C. and includes a correction for the presence of catalyst residues.

Melt flow index (MFI) was measured by the method of ASTM D-1238-70, Procedure A, Condition E using a 2.16 Kg weight at 190° C. and reported as grams per 10 minutes.

Flow ratio was measured by the method of ASTM D-1238-70, Procedure A, Condition F using a 21.60 Kg weight at 190° C. and dividing by the MFI measured as defined above.

TABLE 3

| Example No. | Transition Metal Composition Prepared in Ex No. | Mmols of Ti used | Product Fully Annealed Density | Melt Flow Index | Flow Ratio | Yield (gms) | Catalyst Activity (gms of polymer/m. atom Ti/atm./hour) |
|---|---|---|---|---|---|---|---|
| 26 | 1  | 0.01  | 0.9334 | 1.7   | 38  | 207 | 1640 |
| 27 | 9  | 0.01  | 0.9349 | 4.0   | 27  | 230 | 1825 |
| 28 | 10 | 0.01  | 0.9344 | 1.1   | 44  | 132 | 1100 |
| 29 | 23 | 0.01  | 0.9322 | 1.3   | 37  | 83  | 670  |
| 30 | 11 | 0.01  | 0.9344 | 10.6  | 28  | 303 | 2400 |
| 31 | 24 | 0.01  | 0.9382 | 0.6   | 46  | 176 | 410  |
| 32 | 12 | 0.005 | a      | 0.97  | 37  | 78  | 320  |
| 33 | 18 | 0.005 | 0.9286 | 1.46  | 33  | 216 | 885  |
| 34 | 19 | 0.02  | 0.9413 | 1.81  | 46  | 260 | 1062 |
| 35 | 20 | 0.02  | 0.9326 | 0.45  | 60  | 171 | 699  |
| 36 | 15 | 0.01  | a      | 0.71  | 41  | 333 | 2721 |
| 37 | 21 | 0.005 | 0.9250 | 0.013 | 157 | 299 | 4886 |
| 38 | 16 | 0.02  | a      | 0.08  | 76  | 52  | 212  |
| 39 | 22 | 0.005 | 0.9321 | 0.10  | 99  | 197 | 3219 |
| 40 | 17 | 0.005 | 0.9344 | 3.3   | 26  | 217 | 3500 |
| 41 | 25 | 0.01  | 0.9224 | 6.6   | 33  | 199 | 1630 | a: not determined

We claim:

1. A process for the production of a transition metal composition which process comprises spraying a material which comprises a hot single phase liquid and cooling the spray so formed so as to obtain essentially spheroidal particles characterised in that the said single phase liquid has a composition represented by the general formula:

$$M_mX_pTY.nZ \qquad (I)$$

where

M, where present, represents at least one metal of Groups Ib, IIa, IIIb, VIIa, VIII or the lanthanide series of the Periodic Table, X, where present, represents at least one anion, T represents at least one transition metal of Groups IVA, VA or VIA of the Periodic Table, Y represents at least one of the following atoms or groups: halide, oxyhalide, amino, alkoxide, thioalkoxide, carboxylate or sulphonate in an amount to satisfy the valency which T has in the composition, Z, where present, represents at least one melt-producing compound which, on heating with the transition metal compound TY, forms a single phase liquid, m is zero or a number less than 100;

n is zero or a number less than 8 (m+one); and $$p \text{ is } \frac{m \times (\text{valency of } M)}{(\text{valency of } X)}$$

2. A process as claimed in claim 1 wherein the hot single phase liquid is formed by heating a mixture of at least one transition metal compound, at least one metal M compound and at least one melt-producing compound in the ratio to give a composition of formula (I).

3. A process as claimed in claim 1 wherein the hot single phase liquid is at a temperature in the range 30° C. up to 400° C.

4. A process as claimed in claim 1 where the hot single phase liquid is a melt and is at a temperature in the range from the melting point of the melt to 100° C. above the said melting point.

5. A process as claimed in claim 1 wherein the material which is sprayed comprises the hot single phase liquid together with an inert diluent which is a liquid, a solid which is meltable at the temperature of the hot single phase liquid or a solid which remains unmolten and undissolved at the temperature of the hot single phase liquid.

6. A process as claimed in claim 1 wherein spraying is effected using a spray nozzle, pneumatic atomisation or a spinning disc.

7. A process as claimed in any one of claims 1 to 6 wherein spraying is effected using an elevated pressure of from 5 to 100 kg/cm$^2$ to generate the spray.

8. A process as claimed in claim 1 wherein the melt-producing compound is an alcohol and the essentially spheroidal particles are treated with a halogen-containing compound; or the essentially spheroidal particles are heated to at least partially remove the alcohol therefrom; or the essentially spheroidal particles are heated to at least partially remove the alcohol therefrom and simultaneously or subsequently are treated with a halogen containing compound.

9. A magnesium chloride/titanium chloride/methanol adduct of the general formula:

$$m^2 MgCl_2 \cdot TiCl_x n^2 CH_3OH$$

wherein:
- $m^2$ is a number which is in the range from 5 up to 50;
- $n^2$ is a number which is greater than zero and less than 8 ($m^2$+one); and
- x is 3 or 4.

10. A magnesium chloride/titanium chloride/methanol adduct which incorporates at least one further metal halide selected from zirconium chloride, vanadium chloride, manganous chloride, a chloride of iron, nickel, chloride and copper chloride.

11. A metal halide adduct of the general formula:

$$m^2 MgCl_2 \cdot aM^1Cl_y cTiCl_x bT^1Cl_z \cdot n^3 CH_3OH$$

wherein
- $M^1$ is at least one metal selected from manganese, iron, nickel and copper;
- $T^1$ is at least one metal selected from vanadium and zirconium;
- a is zero or a number having a value less than the value of $m^2$;
- b is zero or a number having a value of less than 5c;
- c is a number which is greater than zero and does not exceed one;
- $m^2$ is a number which is in the range from 5 up to 50;
- $n^3$ is a number which is greater than zero and less than 8 ($m^2$+a+one);
- x is 3 or 4;
- y is equal to the valency of $M^1$;
- z is 3 or 4;
- ($m^2$+a) has a value of from 5 up to 50; and
- (b+c) has a value of one;

with the proviso that at least one of a and b has a value of greater than zero.

12. A polymerisation catalyst which comprises
(a) a transition metal composition obtained by the process of any one of claims 1 to 8 or a solid product or adduct as claimed in any one of claims 9 to 11; and
(b) a Ziegler activator.

* * * * *